(12) United States Patent
Roberts et al.

(10) Patent No.: US 9,546,751 B2
(45) Date of Patent: Jan. 17, 2017

(54) GAS VENTING

(75) Inventors: Andrew Peter Roberts, Newcastle-upon-Tyne (GB); Judimar Clevelario, Newcastle-upon-Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 406 days.

(21) Appl. No.: 14/129,129

(22) PCT Filed: Apr. 27, 2012

(86) PCT No.: PCT/GB2012/050945
§ 371 (c)(1),
(2), (4) Date: Dec. 24, 2013

(87) PCT Pub. No.: WO2013/005000
PCT Pub. Date: Jan. 10, 2013

(65) Prior Publication Data
US 2014/0124076 A1    May 8, 2014

(30) Foreign Application Priority Data

Jul. 4, 2011 (GB) .................................. 1111371.9

(51) Int. Cl.
*F16L 55/00* (2006.01)
*F16L 33/01* (2006.01)
(Continued)

(52) U.S. Cl.
CPC ................ *F16L 55/00* (2013.01); *B23P 11/00* (2013.01); *F16L 33/01* (2013.01); *F16L 11/083* (2013.01); *F16L 11/20* (2013.01); *Y10T 29/49826* (2015.01)

(58) Field of Classification Search
CPC .......... F16L 55/00; F16L 11/083; F16L 11/20; F16L 33/01; F16L 35/00; F16L 31/00; F16L 33/00
(Continued)

(56) References Cited

U.S. PATENT DOCUMENTS 5,654,499 A * 8/1997 Manuli .................... F16L 11/12
138/104
6,039,083 A * 3/2000 Loper .................... F16L 11/083
138/107
(Continued)

FOREIGN PATENT DOCUMENTS

CN   101473157 A    7/2009
CN   101553682 A   10/2009
(Continued)

OTHER PUBLICATIONS

International Search Report, PCT/GB2012/050945, mailed Jan. 24, 2013 (5 pages).
(Continued)

*Primary Examiner* — Beth Stephan
(74) *Attorney, Agent, or Firm* — Reza Mollaaghababa; Thomas Engellenner; Pepper Hamilton LLP

(57) ABSTRACT

An end fitting (300), flexible pipe (100), riser (203), and method of producing the same are disclosed. A method of venting gas from annuli (312, 319) of a flexible pipe is also disclosed. The end fitting includes a first vent flow fluid communication path (311) and a further vent flow fluid communication path (318). The end fitting is capable of enabling gas to be vented from a flexible pipe body with two annulus regions (312, 319).

15 Claims, 8 Drawing Sheets

Figure 1:
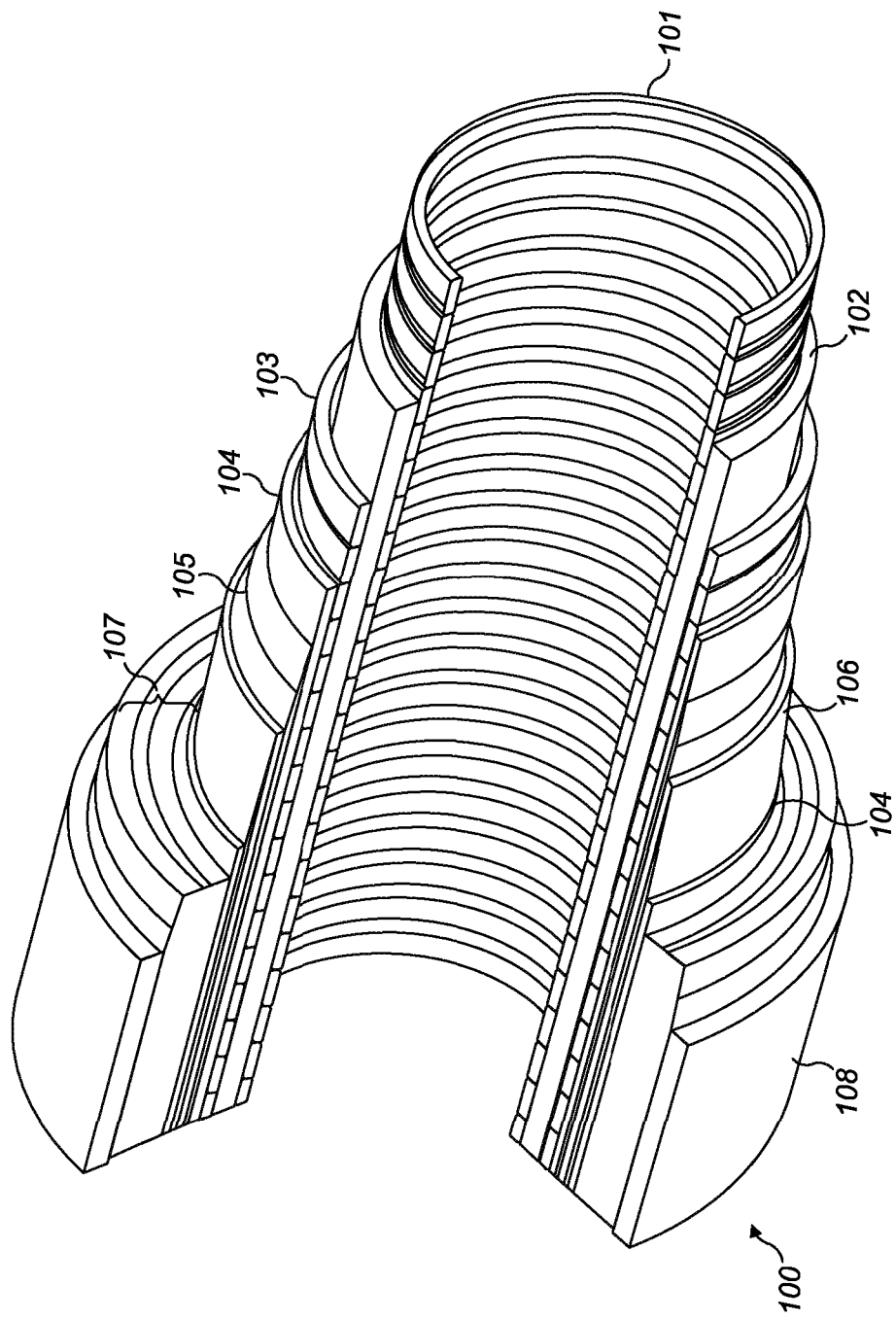

(51) Int. Cl.
*B23P 11/00* (2006.01)
*F16L 11/08* (2006.01)
*F16L 11/20* (2006.01)

(58) Field of Classification Search
USPC .......... 285/222.1, 222.2, 222.3, 222.4, 222.5
See application file for complete search history.

(56) References Cited

U.S. PATENT DOCUMENTS

| | | | |
|---|---|---|---|
| 6,123,114 A | 9/2000 | Seguin et al. | |
| 6,592,153 B1* | 7/2003 | Belcher | F16L 33/01 277/607 |
| 6,634,387 B1* | 10/2003 | Glejbøl | E21B 17/01 138/104 |
| 6,923,477 B2* | 8/2005 | Buon | F16L 33/003 138/109 |
| 2008/0149209 A1 | 6/2008 | Felix-Henry | |
| 2009/0322077 A1* | 12/2009 | Eccleston | F16L 33/01 285/337 |
| 2010/0011556 A1* | 1/2010 | Eccleston | F16L 33/01 29/428 |
| 2010/0068986 A1* | 3/2010 | Eccleston | F16L 11/12 454/339 |
| 2010/0084035 A1 | 4/2010 | Binet et al. | |
| 2011/0229271 A1* | 9/2011 | Clements | F16L 33/01 405/224.2 |

FOREIGN PATENT DOCUMENTS

| | | |
|---|---|---|
| WO | 2010067092 A1 | 6/2010 |
| WO | 2011120525 A1 | 10/2010 |
| WO | 2012092931 A1 | 7/2012 |

OTHER PUBLICATIONS

International Preliminary Report on Patentability, PCT/GB2012/050945, mailed Jan. 7, 2014 (9 pages).
Notification of First Office Action issued Feb. 16, 2015 with Text of the First Office Action corresponding to Chinese Application No. 201280042974.5 (4 sheets).
Search Report issued Jan. 20, 215 corresponding to Chinese Application No. 201280042974.5 (2 sheets).

* cited by examiner

GAS VENTING

The present invention relates to gas venting. In particular, but not exclusively, the present invention relates to the venting of gas from a flexible pipe, including flexible pipe body and one or more end fittings, and also to the end fitting and flexible pipe itself. The venting helps to prevent the build up of gases that have permeated into the flexible pipe body from fluids such as oil or gas being transported, and helps to reduce the risk of collapse of the flexible pipe body.

Traditionally flexible pipe is utilised to transport production fluids, such as oil and/or gas and/or water, from one location to another. Flexible pipe is particularly useful in connecting a sub-sea location (which may be deep underwater) to a sea level location. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

During operation, production fluids are transported along an inner bore of the flexible pipe. These production fluids may contain, or themselves comprise, gas. If an inner fluid retaining layer used to contain the fluids permits such gas to permeate therethrough, the gas can collect within the layers of the flexible pipe body. Generally speaking, the fluid retaining layer is composed of a material that prevents outward migration of production fluids. However, over time gas can slowly permeate through the fluid retaining layer and radially outwards into an annular region beyond the fluid retaining layer. The annular region extends to the next generally impermeable layer. The gas will tend to accumulate in the annulus region, and if this gas is not released, the build up of pressure (over-pressurization of annulus gas) can cause failure of the flexible pipe. This is also a problem for flexible pipes that may be depressurized during use, i.e. when fluid is stopped from flowing through the pipe bore, which may occur for various reasons.

WO2010/067092 discloses an arrangement suitable for venting an annulus region of a flexible pipe. Generally, the flexible pipe and end fitting include specific features, such as a vent pathway, that allows built up gas to be exhausted into the atmosphere.

However, some known techniques for venting gases are unable to vent gases that collect in certain regions of a flexible pipe, or may be complex or expensive. There is no known method for preventing pressure build up in a flexible pipe body that has two annuli (that is, a first annulus located between an inner fluid retaining layer and a seal layer, and a second annulus between the seal layer and an outer sheath layer.

Some known techniques require an operator to actively monitor gas pressure in the annulus and open and close release valves to relieve pressure from gas build up in the annulus.

In addition, transportation of production fluids is known to often lead to various layers of the flexible pipe being subject to relatively acidic conditions. Such "sour" service is due to the migration of hydrogen sulphide ($H_2S$) along with other species, such as $CO_2$, from the internal bore of the pipe radially outwards. This is a result of some production fluids containing relatively high concentrations of hydrogen sulphide gas in solution or in gaseous form. Under such circumstances over time hydrogen sulphide and the other gas species such as $CO_2$ permeate through the fluid retaining layer into annulus regions defined between layers of the flexible pipe body. The $H_2S$ and $CO_2$ collect in these annular regions and gradually increase the acidity (reduce pH) of the environment in those regions. Metal components, for example the tapes forming the pressure armour layer and/or tensile armour layer in those annular regions, are thus subjected to acid enhanced corrosion, which, if not mitigated, could lead to extremely high corrosion rates and possibly failure. It will also be appreciated that end fittings potentially include many metallic component parts, and could equally be subjected to an acid environment.

Such a sour service environment can affect the overall performance of a flexible pipe over time. This can lead to a reduced lifetime expectation or even failure of the flexible pipe during use. A known technique is to use "sour service materials" for potentially vulnerable components of the flexible pipe. This typically involves the use of a wire that has undergone hot/cold working during manufacture, and/or has had corrosion resistant additives added. These sour wires are more costly than standard, non-worked wires (so called sweet wires for use in non-acidic environments). The sour wires are also weaker than sweet wires, meaning more material is needed to compensate for the wire's reduction in strength.

It is an aim of the present invention to at least partly mitigate the above-mentioned problems.

It is an aim of embodiments of the present invention to provide an arrangement in which flexible pipe body is less likely to be overpressurized by gas build up.

It is an aim of embodiments of the present invention to provide apparatus for enabling gas to be vented from a flexible pipe body with two annulus regions, and a method of venting such a flexible pipe body.

It is an aim of embodiments of the present invention to provide a flexible pipe that is cheaper and lighter than certain known flexible pipes.

According to a first aspect of the present invention there is provided a end fitting suitable for venting gas from annuli of a flexible pipe body connected thereto, comprising:
  a first vent flow fluid communication path for connecting in fluid communication an inner annulus region of the flexible pipe body and an exit port at an exterior of the end fitting; and
  a further vent flow fluid communication path for connecting in fluid communication an outer annulus region of the flexible pipe body and either the said exit port or a further exit port at the exterior of the end fitting.

According to a further aspect of the present invention there is provided an end fitting suitable for venting gas from annuli of a flexible pipe body connected thereto, comprising:
  a first vent flow fluid communication path for connecting in fluid communication an inner annulus region of the flexible pipe body and an exit port at an exterior of the end fitting;
  a further vent flow fluid communication path for connecting in fluid communication an outer annulus region of the flexible pipe body and either the said exit port or a further exit port at the exterior of the end fitting; and
  a non-return valve provided in the further vent flow fluid communication path for inhibiting gas from entering the outer annulus region from the end fitting.

According to a further aspect of the present invention there is provided a method of providing an end fitting suitable for venting gas from annuli of a flexible pipe body connected thereto, comprising:

providing a first vent flow fluid communication path for connecting in fluid communication an inner annulus region of the flexible pipe body and an exit port at an exterior of the end fitting;

providing a further vent flow fluid communication path for connecting in fluid communication an outer annulus region of the flexible pipe body and either the said exit port or a further exit port at the exterior of the end fitting; and providing a non-return valve in the further vent flow fluid communication path for inhibiting gas from entering the outer annulus region from the end fitting.

According to a further aspect of the present invention there is provided a method of venting gas from annuli of a flexible pipe, comprising:

connecting in fluid communication an inner annulus region of the flexible pipe body and an exit port of an end fitting assembly in which an end of the flexible pipe body is terminated;

connecting in fluid communication an outer annulus region of the flexible pipe body and either the said exit port or a further exit port of the end fitting assembly; and inhibiting has from entering the outer annulus region from the end fitting assembly via a non-return valve.

Certain embodiments of the present invention provide a methodology and apparatus for reducing the development of pressure in annular regions of a flexible pipe by allowing gas to be vented from the annular regions of a flexible pipe body. Certain embodiments provide an arrangement in which a flexible pipe is cheaper and lighter than known flexible pipes. Certain embodiments provide an arrangement in which some sour service wires of a flexible pipe body can be replaced by sweet service wires.

Figure 2:
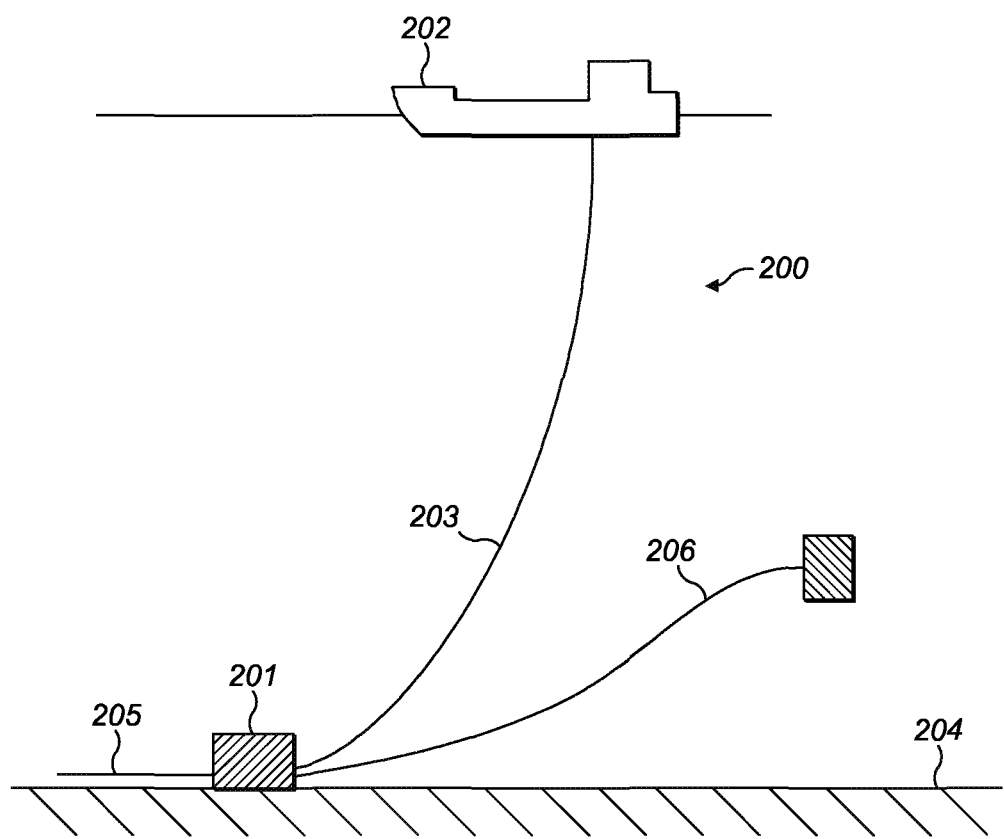
Figure 3:
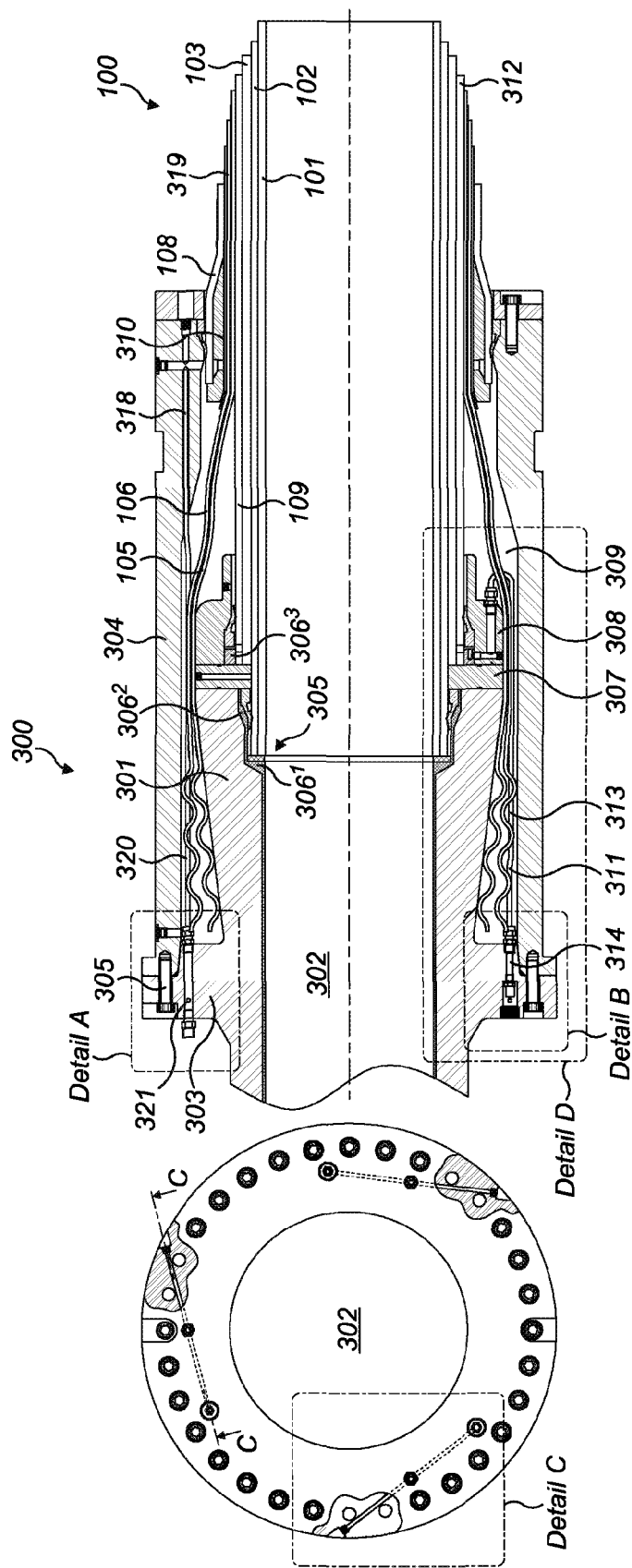
Figure 6:
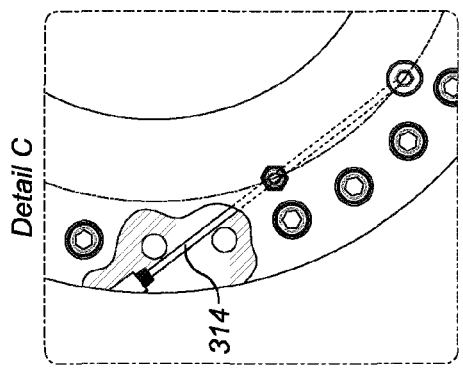
Figure 5:
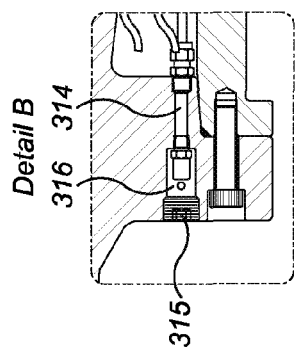
Figure 4:
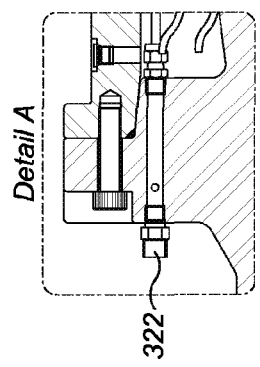
Figure 7:
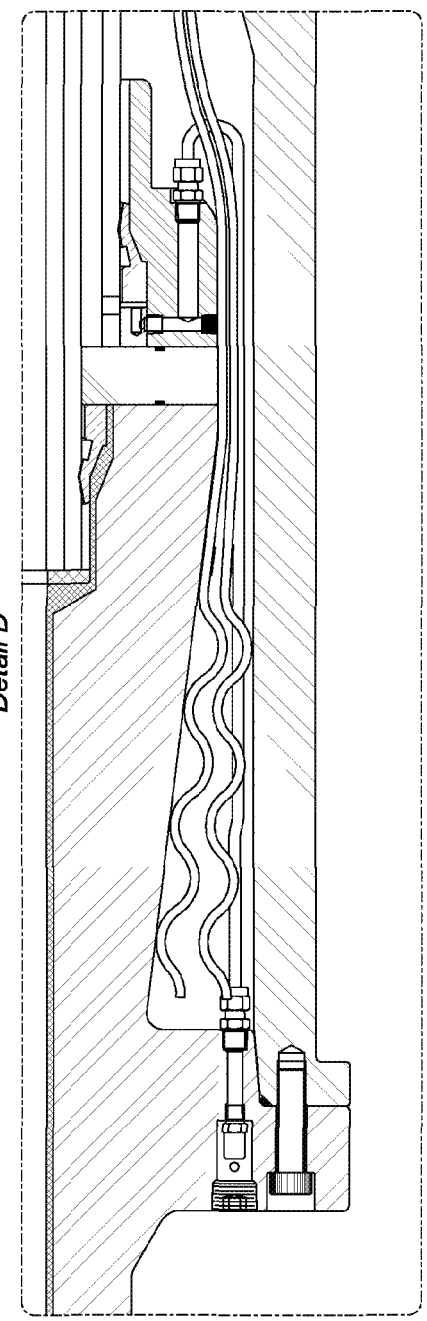
Figure 8:
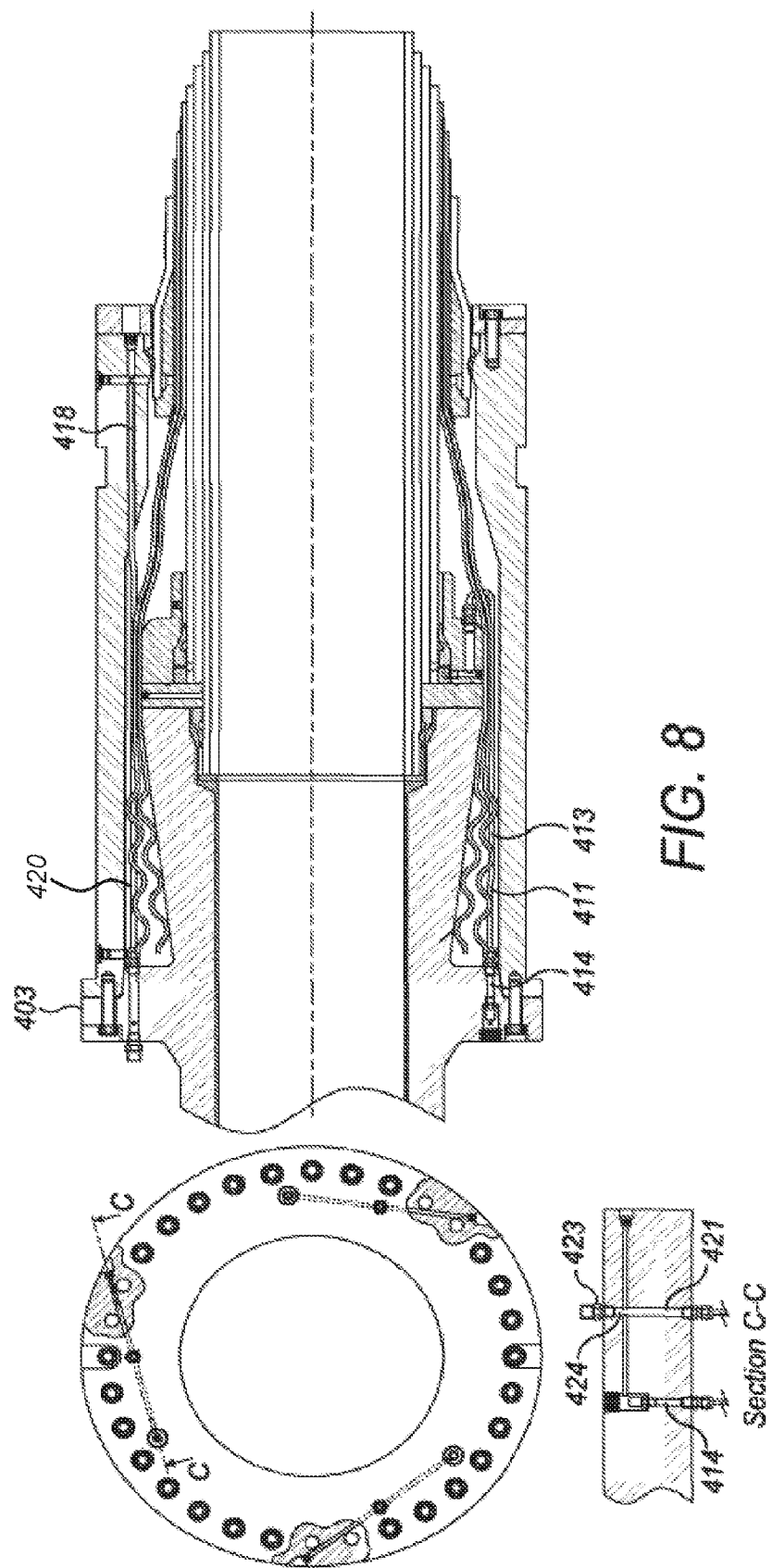
Figure 9:
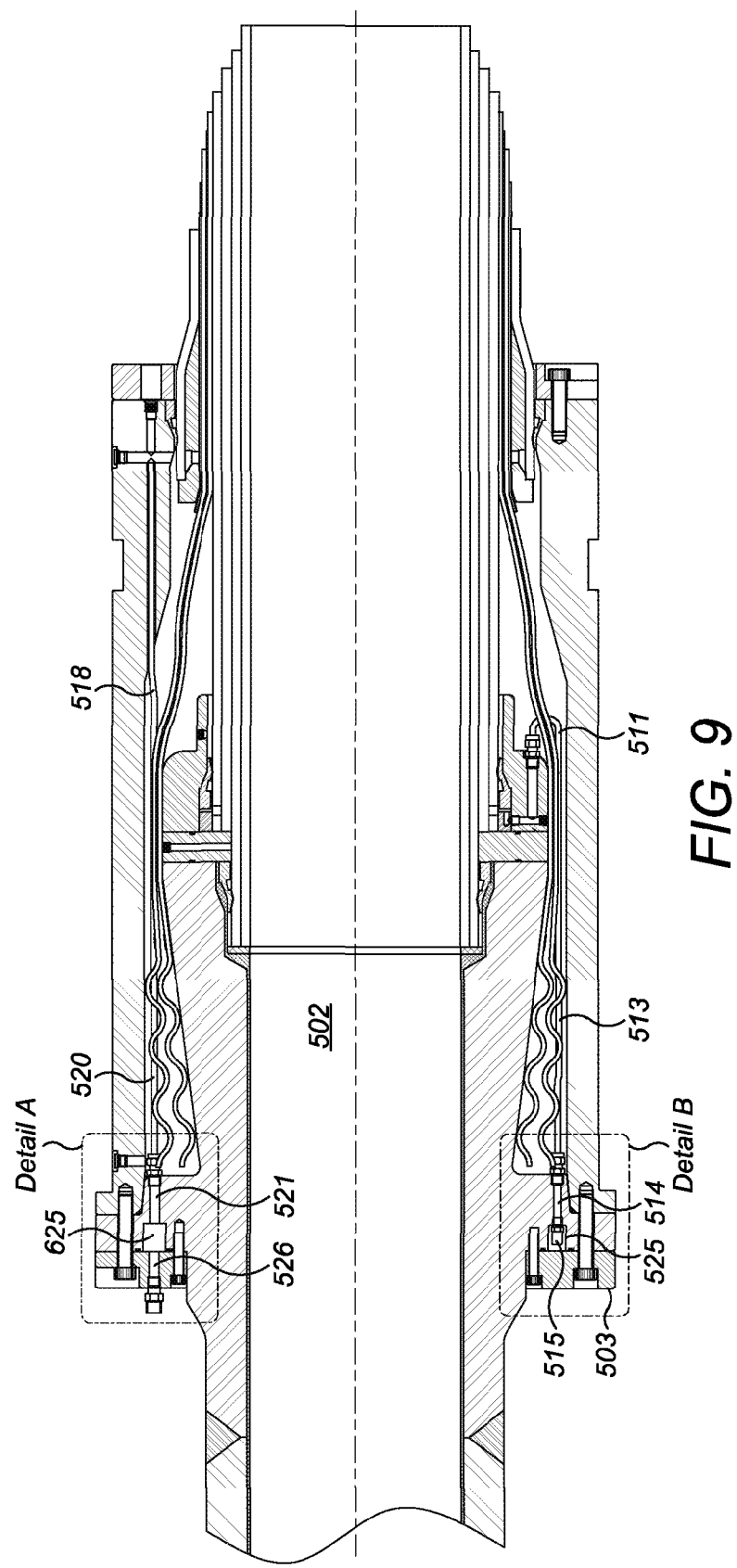
Figure 10:
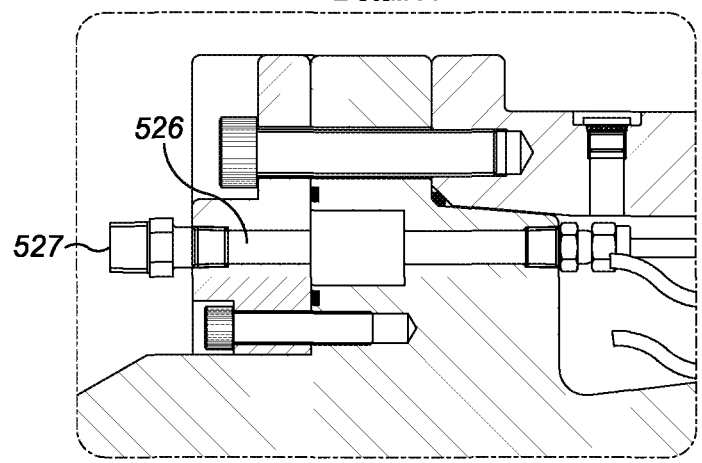
Figure 11:
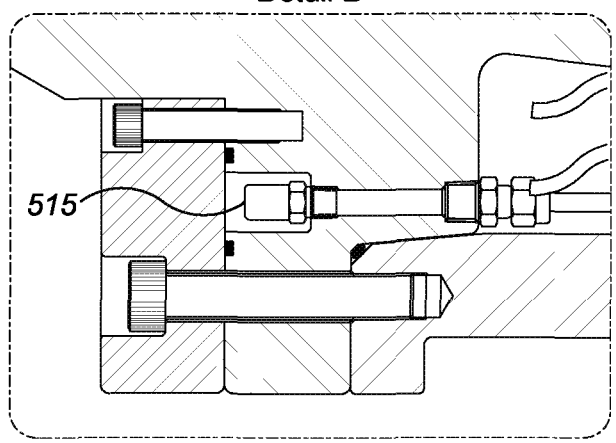
Figure 12:
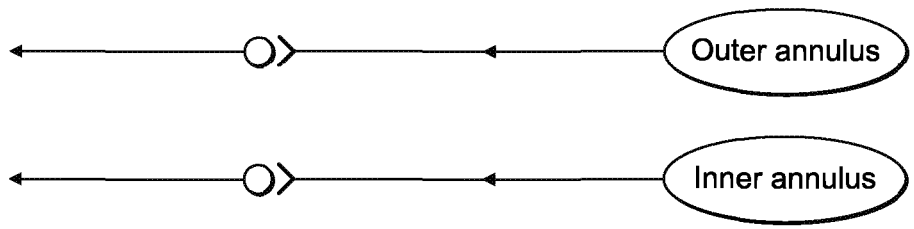
Figure 13:
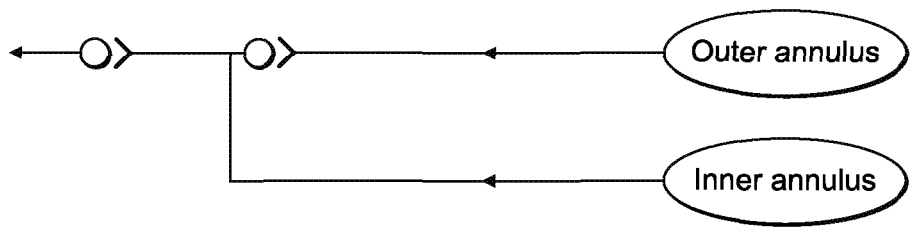
Figure 14:
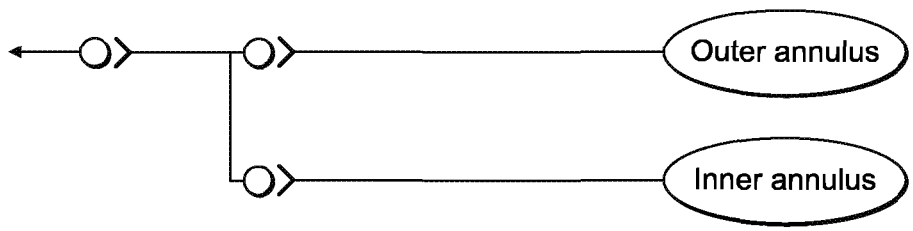

Embodiments of the invention are further described hereinafter with reference to the accompanying drawings, in which:

FIG. 1 illustrates a flexible pipe body;
FIG. 2 illustrates a riser assembly;
FIG. 3 illustrates an end fitting of a flexible pipe;
FIG. 4 illustrates an enlarged portion of part of FIG. 3;
FIG. 5 illustrates an enlarged portion of part of FIG. 3;
FIG. 6 illustrates an enlarged portion of part of FIG. 3;
FIG. 7 illustrates an enlarged portion of part of FIG. 3;
FIG. 8 illustrates a further end fitting of a flexible pipe;
FIG. 9 illustrates a further end fitting of a flexible pipe;
FIG. 10 illustrates an enlarged portion of part of FIG. 9;
FIG. 11 illustrates an enlarged portion of part of FIG. 9;
FIG. 12 illustrates a schematic representation of the vent paths of FIG. 3;
FIG. 13 illustrates a schematic representation of the vent paths of FIG. 8; and
FIG. 14 illustrates a schematic representation of the vent paths of FIG. 9.

In the drawings like reference numerals refer to like parts.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises an extruded polymer layer used to protect the pipe against penetration of seawater and other external environments, corrosion, abrasion and mechanical damage.

In addition, the flexible pipe body may also include a seal layer (not shown in FIG. 1) between the internal pressure sheath 102 and the outer sheath 108. The seal layer may be of extruded polymer, for example, and can be used to surround the pressure armour layer 103 for the purpose of giving the pipe body increased resistance to collapse. The seal layer may provide containment of the production fluid if the internal pressure sheath is breached, or provide containment should the outer sheath be breached.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application.

The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

FIG. 3 illustrates how an end of a segment of flexible pipe body 100 may be terminated in an end fitting 300 in accordance with an embodiment of the present invention. The end fitting 300 includes a generally annular body 301, which has an axially extending inner bore 302. The end fitting body is made from steel or other such rigid material. The inner bore 302 has a diameter that preferably matches a corresponding inner diameter of the segment of flexible pipe body to be terminated in the end fitting 300. In use, production fluid can flow smoothly through the inner bore of the flexible pipe body and the inner bore 302 of the end fitting. The end fitting body 301 at a first end thereof defines an open mouth region in which a suitably cut end of flexible pipe body may be introduced during a termination process. A flange region 303 extends outwardly from the end fitting body 301 and is located near a remaining end region of the end fitting body. The flange region forms a connector for connecting the end fitting to a matching connector of a further end fitting of an adjacent segment of flexible pipe, or to a floating or stationery structure or vessel for example. An end fitting jacket 304 is secured to the flange region 303 by a suitable securing mechanism such as one or more bolts 305. The jacket 304 houses various components of the end fitting and helps to protect them.

The flexible pipe body 100 is a multi-layered structure, for example as per FIG. 1, comprising at least a carcass layer 101, barrier layer 102 and outer sheath 108. In this embodiment the flexible pipe body also includes a seal layer 109 of polymer provided around a pressure armour layer 103. The various layers of flexible pipe body are cut at desired lengths prior to termination in the end fitting 300.

The flexible pipe body is brought together with the open mouth region of the end fitting body 301. The open mouth region has a stepped region 305 to receive a sealing ring $306_1$, and then the carcass layer 101 and barrier layer 102. The sealing ring $306_1$ helps to seal the ends of the carcass layer and barrier layer.

A further sealing element $306_2$ is located in a generally tapered recess formed between an inner surface of the open mouth region and a radially outer surface of the barrier layer 102. The sealing element $306_2$ is generally annular with a tapered edge to conform to the end fitting body, and may be of polymer or metal or a mixture thereof, for example.

An inner collar 307 is secured to an end of the open mouth region of the end fitting. During the termination process the securing of the inner collar 307 to the end fitting 300 will drive the sealing ring $306_2$ into the tapered recess to provide a good seal. The inner collar 307 is of steel in this embodiment and is substantially ring-like in shape. Further o-ring seals may be provided to help provide a seal for preventing a leak path between the inner collar 307 and the end fitting, and the inner collar and an outer collar 308.

The outer collar 308 may be a Flexlok™ collar available from Wellstream International Limited. The outer collar is provided radially outwards of a seal layer 109 and is secured to the end fitting by one or more bolts, for example, via the inner collar 307. A yet further sealing element $306_3$ is located in a tapered recess between an inner surface of the outer collar 308 and a radially outer surface of the seal layer 109. The seal ring $306_3$ may be a Flexlok™ Ring available from Wellstream International Limited, for example.

Further layers of the flexible pipe body that lie radially outside the seal layer 109 are terminated at desired lengths within a cavity 309 defined between an inner surface of the jacket 304, the end fitting body 301 and the seal layer 109. In this embodiment the cavity 309 is filled with a resin material to help secure layers of flexible pipe body to the end fitting. An outer sheath 108 is secured between a collar 310 and the end fitting jacket 304.

It will be appreciated that the barrier layer 102 and the seal layer 109, which is coaxial with the barrier layer 102, form between them an elongate annular region. In the present embodiment this annular region contains the pressure armour layer 103, but could include further layers such as armour wires and tape layers depending on the flexible pipe body design.

Similarly, the seal layer 109 and outer sheath 108, which is coaxial with the seal layer 109, form between them a further elongate annular region. In this embodiment this further annular region contains the tensile armour layers. Again, this annular region could contain other layers such as armour wires and tape layers depending on the flexible pipe body design.

As mentioned above, when production fluid such as gas or liquids containing gas are transported through a flexible pipe, over time gas can permeate through the fluid retaining layer (barrier layer) and accumulate in the annulus region. With two annulus regions, gas could firstly accumulate in the inner annulus region, before pressure builds and the gas migrates though the seal layer to the outer annulus region. Any build up of pressure in an annulus region is detrimental to the construction of the flexible pipe body and could decrease lifetime or cause complete failure of the flexible pipe.

In the present embodiment, a vent flow fluid communication path (or "vent path") 311 for venting an inner annulus region 312 of the flexible pipe body is formed through the end fitting 300 between the inner annulus region 312 and an outer surface of the end fitting 300. A passageway runs through the inner collar 307 and a further passageway runs through the outer collar 308. These passageways are formed to link the inner annulus region 312 with a tubular conduit 313 provided in the cavity 309. The tubular conduit 313 extends from the connection with the passageway in the outer collar to a connection with a further passageway 314 in the flange region 303 of the end fitting. An enlarged view of the vent path in the section identified as DETAIL D is shown in FIG. 7.

The passageway 314 runs from the connection with the tubular conduit 313 in a direction parallel to the pipe's longitudinal axis, and then turns 90° towards an exit point on the side of the end fitting. An enlarged view of the vent path 311 in the section identified as DETAIL B is shown in FIG. 5. The vent path 311 additionally includes a valve 315 located in a recess 316 in the end fitting. The valve 315 is a non-return valve of a mechanical type that opens when a small pressure difference is created across the vent valve. This pressure difference may be set at around 2 bar. Accumulated gas may vent by virtue of an internal pressure being higher than a pressure downstream of the vent valve (i.e. after the vent valve in terms of gas being exhausted from the annulus region to an exit point). The non-return valve 315 provided in the vent path helps prevent or inhibit gas from returning to the inner annulus region from the end fitting.

The drawing on the left hand side of FIG. 3 shows a view of the end fitting 300 in a section orthogonal to the view shown on the right hand side of FIG. 3. An enlarged view of the vent path in the section identified as DETAIL C is shown in FIG. 6. As can be seen from the drawing on the left hand side of FIG. 3, the end fitting of the present embodiment actually includes 3 separate vent paths fluidly connected to the inner annulus region of the flexible pipe body. The provision of 3 vent paths is simply for redundancy and helps to maintain the function of the vent path should there be a blockage, for example. However, a single vent path, or any number of vent paths, could equally be used.

Referring again to FIG. 3, a further vent flow fluid communication path (or "vent path") 318 for venting an outer annulus region 319 of the flexible pipe body is formed through the end fitting 300 between the outer annulus region 319 and an outer surface of the end fitting 300. A passageway runs through the end fitting jacket 304 from an end region of the jacket furthest from the flange region. The passageway runs radially outwards from the bore region and then turns 90° to run parallel to the pipe's longitudinal axis. As can be seen in FIG. 3, this passageway is actually formed by two passageways provided at 90° that interconnect at a junction, with the redundant sections of the passageways being blocked by plug members, or the like. Part way along the jacket 304, the passageway emerges from the jacket and is connected to a tubular conduit 320 located in the cavity 309. The tubular conduit extends from the connection with the passageway in the jacket to a connection with a further passageway 321 in the flange region 303 of the end fitting. These passageways 318, 320, 321 link the outer annulus region 319 with an exterior region of the end fitting 300. Exhaust gas may migrate from the outer annulus region 319 through the cavity 309 to the passageways. The cavity 309 may be filled with a resin, in which case a venting conduit could be placed in the cavity prior to filling with resin, such that the conduit could fluidly connect the outer annulus region with the passageways.

An enlarged view of the vent path 318 in the section identified as DETAIL A is shown in FIG. 4. The vent path 318 additionally includes a valve 322 located at an exit port 323 of the end fitting. The valve 322 is a non-return valve of a mechanical type that opens when a small pressure difference is created across the vent valve. This pressure difference may be set at around 2 bar. Accumulated gas may vent by virtue of an internal pressure being higher than a pressure downstream of the vent valve. The non-return valve 322 provided in the vent path helps prevent or inhibit gas from returning to the outer annulus region from the end fitting.

During operation, accumulated gas in the annuli of the flexible pipe may be exhausted to a flare system above sea level, for example, via exhaust pathways. A first pathway is provided by the inner annulus region 312, pathways in the inner collar 307 and outer collar 308, the tubular conduit 313 and the passageway 314. The passageway 314 may be connected to a tubular conduit to take the exhausted gas to a flare system or other suitable exit point or collection point. A second pathway is provided by the outer annulus region 319, the pathway in the jacket 304, the tubular conduit 320 and the passageway 321. Again, the passageway 321 may be connected to a tubular conduit to take the exhausted gas to a flare system or other suitable exit point or collection point.

In this embodiment, the apparatus is arranged such that gas is completely prevented from mixing between the annular regions, with each annulus being provided with a separate vent path to exhaust any accumulating gas. Each vent path also has a non-return valve to help prevent gas from returning to the respective annulus region. However, each or one of the vent paths could alternatively be provided without a non-return valve.

A schematic diagram showing the vent paths described above in relation to the first embodiment is shown in FIG. 12. Each vent path is shown as suitable for venting gas from the annulus on the right, flowing towards the exit point on the left, via a non-return valve.

A second embodiment of the present invention is illustrated in FIG. 8. The second embodiment shares many similar features with the first embodiment described above, and these features will not be described again. However, the apparatus of the second embodiment includes a first vent path 411 connected to an inner annulus region of a flexible pipe body, and a further vent path 418 connected to an outer annulus region of the flexible pipe body, with the first vent path being connected to the second vent path. With this arrangement, the first and further vent paths vent gas to a single exit point at the exterior of the end fitting.

In more detail, the first vent path 411 extends from the inner annulus region to the flange region 403 in a pathway similar to that described above in relation to embodiment 1. Within the flange region 403, a passageway 414 runs from the connection with the tubular conduit 413 in a direction parallel to the pipe's longitudinal axis, and then turns 90° towards an exit point on the side of the end fitting. However, that exit point is blocked by a plug member. The further vent path 418 extends from the outer annulus region to the flange region in a pathway similar to that described above in relation to embodiment 1. Within the flange region 403, a passageway 421 connects the tubular conduit 420 with the exterior of the end fitting and extends in a direction parallel to the longitudinal axis of the pipe.

The passageway 414 meets the passageway 421 at a junction 424 within the flange region such that the two passageways are fluidly connected. The junction 424 can be seen in the Section C-C of FIG. 8. As such, gas may be exhausted from both the inner and outer annulus regions to an exit point via the junction and section of the passageway 421.

The vent path 418 includes a non-return valve at a point upstream of the junction 424 (i.e. before the junction in terms of exhaust gas flowing from the annulus region to the exit point, or between the annulus region and the junction). The vent path 411 does not include a non-return valve upstream of the junction 424. However, a further non-return valve is located at an exit port 423 of the end fitting (downstream of the junction 424).

In this embodiment, the apparatus is arranged such that exhausted gas from the inner or outer annulus region is prevented from entering the outer annulus region by a non-return valve. A further non-return valve located at a position downstream of where the two vent paths meet generally ensures that gas is prevented from returning to the inner annulus region.

A schematic diagram showing the vent paths described above in relation to the second embodiment is shown in FIG. 13.

A third embodiment of the present invention is illustrated in FIG. 9. The third embodiment shares many similar features with the first and second embodiments described above, and these features will not be described again.

However, in this embodiment a first vent path 511 and a second vent path 518 for venting the inner and outer annulus regions, respectively, each extend towards a common chamber located in the end fitting, from which a single exit vent path runs to the exterior of the end fitting.

In more detail, the first vent path 511 extends from the inner annulus region to the flange region 503 in a pathway similar to that described above in relation to embodiment 1. Within the flange region 503, a passageway 514 runs from the connection with the tubular conduit 513 in a direction parallel to the pipe's longitudinal axis. The passageway 514 meets a chamber 525 located within the flange region 503, the chamber being an annular hollow cavity within the flange region extending concentrically with the flange region 503 and inner bore 502 of the end fitting. An enlarged view of the vent path 511 in the section identified as DETAIL B is shown in FIG. 11.

The second vent path 518 extends from the outer annulus region to the flange region 503 in a pathway similar to that described above in relation to embodiment 1. Within the flange region 503, a passageway 521 runs from the connection with the tubular conduit 520 in a direction parallel to the longitudinal axis of the pipe. The passageway 521 meets the chamber 525 within the flange region. An enlarged view of the vent path 518 in the section identified as DETAIL A is shown in FIG. 10.

The vent path 511 includes a non-return valve 515 located at a position along the passageway 514, at a point upstream of the chamber 525 (i.e. before the chamber in terms of gas flowing from the annulus region to an exit point). The vent path 518 includes a non-return valve (not shown) at a position along the passageway 521, at a point upstream of the chamber 525.

A further passageway 526 extends through the flange region 503 from the chamber 525 to an exit port 523, allowing gas to be exhausted from the common chamber to an exit point.

The apparatus additionally includes a valve 527 located at the exit port 523 of the end fitting.

A schematic diagram showing the vent paths described above in relation to the third embodiment is shown in FIG. 14.

In this embodiment, the apparatus is arranged such that exhausted gas from the inner or outer annulus region is prevented from returning to each respective annulus region by a non-return valve. A further non-return valve located at a position downstream of the chamber 525 generally ensures that exhaust gas remains flowing away from the flexible pipe body and towards an exit point.

With the apparatus described above, a flexible pipe body with two annulus regions can be vented to prevent gas build up in the annulus regions over-pressurizing the pipe.

In addition, since the exhaust gases are never returned to the outer annulus, any wires or metal portions provided within the outer annulus region may be formed of sweet wires. This is because gas containing $H_2S$ or $CO_2$, for example, will generally be vented away from the inner annulus region and will not reach the outer annulus region. In general, acidic gases will be filtered out as gas migrates from the pipe bore to the inner annulus, and then filtered again as the gas migrates from the inner annulus to the outer annulus. Replacement of sour wires of a known flexible pipe with at least some sweet wires will give benefits in terms of pipe weight and amount of materials required.

Various modifications to the detailed designs as described above are possible. For example, it will be appreciated that the fluid communication pathways need not be routed specifically as described above and as shown in the attached drawings. For example, the inner annulus region could be connected to the outside of the end fitting via a passageway that runs directly through the end fitting body. Similarly, the exit ports where the vent path emerges from the end fitting could be provided on any of the faces of the end fitting (front, back or side) and are not limited to the end face and side face as shown in the drawings.

it will be appreciated that any number of vent valves can be provided in the vent paths from the annulus regions to the exit point(s). Conversely, some embodiments may require fewer or no vent valves to be present for gas to exhausted.

The non-return valves described above have been described to open when a pressure difference of 2 bar is created across the vent valve. However, other valves could be used, and other pressure differences greater or less that 2 bar can be employed, such as a valve that opens with a pressure difference of 5 bar, for example.

Furthermore, it has been described above that a tubular conduit may be connected to an end fitting exit port of the vent paths so that accumulating gas may be removed from the flexible pipe body. Of course this could be any suitable conduit such as a rubber hose, or alternatively gas could be exhausted directly into the surrounding seawater. Alternatively, the conduit or a passageway could be directed through the flexible pipe itself, rather than being exterior to the flexible pipe.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An end fitting suitable for venting gas from annuli of a flexible pipe body connected thereto, comprising:
    a first vent flow fluid communication path connecting in fluid communication an inner annulus region of the flexible pipe body and an exit port at an exterior of the end fitting;
    a further vent flow fluid communication path connecting in fluid communication an outer annulus region of the flexible pipe body and either the said exit port or a further exit port at the exterior of the end fitting; and
    a non-return valve provided in the further vent flow fluid communication path for inhibiting gas from entering the outer annulus region from the end fitting.

2. The end fitting as claimed in claim 1, wherein the further vent flow fluid communication path is suitable for connecting in fluid communication the outer annulus region of the flexible pipe body and the exit port.

3. The end fitting as claimed in claim 2, wherein the further vent flow fluid communication path is fluidly connected to the first vent flow fluid communication path.

4. The end fitting as claimed in claim 3, wherein the non-return valve is provided in the further vent flow fluid communication path at a location between the outer annulus region and a section of the further vent flow fluid communication path at which the first vent flow fluid communication path connects therewith; and
    further comprising a further non-return valve provided at a location between the exit port and the section of the further vent flow fluid communication path at which the first vent flow fluid communication path connects therewith.

5. The end fitting as claimed in any of claim 1, further comprising a chamber region within the end fitting, wherein the first and further vent flow fluid communication paths each connect the respective inner and outer annulus regions to the chamber region, and wherein the chamber region is fluidly connected to the exit port.

6. The end fitting as claimed in claim 5, further comprising a further non-return valve provided in the first vent flow fluid communication path for inhibiting gas from entering the inner annulus region from the end fitting.

7. The end fitting as claimed in claim 1, wherein the further vent flow fluid communication path is suitable for connecting in fluid communication the outer annulus region of the flexible pipe body and the further exit port at the exterior of the end fitting.

8. The end fitting as claimed in claim 7, further comprising a further non-return valve provided in the first vent flow fluid communication path for preventing gas from entering the inner annulus region from the end fitting.

9. The end fitting as claimed in claim 1 wherein the first and further vent flow fluid communication paths each comprise a fluid conducting tube element.

10. The end fitting as claimed in claim 1 wherein the end fitting comprises a substantially cup-shaped body portion comprising an open mouth region at an end thereof into which the flexible pipe body is locatable.

11. A flexible pipe comprising an end fitting as claimed in claim said flexible pipe body comprising the inner annulus region and the outer annulus region.

12. The flexible pipe as claimed in claim 11 further comprising a fluid retaining layer defining a bore along which transfer fluids can be transferred, an outer sheath layer defining an outer surface of the flexible pipe body, and a seal layer provided between the fluid retaining layer and the outer sheath layer, with an inner annulus between the fluid retaining layer and seal layer, and an outer annulus between the seal layer and outer sheath layer.

13. A riser comprising the flexible pipe as claimed in claim 11.

14. A method of providing an end fitting suitable for venting gas from annuli of a flexible pipe body connected thereto, comprising:
    providing a first vent flow fluid communication path connecting in fluid communication an inner annulus region of the flexible pipe body and an exit port at an exterior of the end fitting;
    providing a further vent flow fluid communication path connecting in fluid communication an outer annulus region of the flexible pipe body and either the said exit port or a further exit port at the exterior of the end fitting; and
    providing a non-return valve in the further vent flow fluid communication path for inhibiting gas from entering the outer annulus region from the end fitting.

15. A method of venting gas from annuli of a flexible pipe, comprising:
    connecting in fluid communication an inner annulus region of the flexible pipe body and an exit port of an end fitting assembly in which an end of the flexible pipe body is terminated;
    connecting in fluid communication an outer annulus region of the flexible pipe body and either the exit port or a further exit port of the end fitting assembly; and
    inhibiting gas from entering the outer annulus region from the end fitting assembly via a non-return valve.

* * * * *